United States Patent [19]

Gregory et al.

[11] 4,104,097
[45] Aug. 1, 1978

[54] METHOD FOR MAKING FLEXIBLE DUCT

[75] Inventors: Raymond A. Gregory, Garfield Heights; DeWitt Gifford Wilcox, Tallmadge, both of Ohio

[73] Assignee: Clecon Incorporated, Cleveland, Ohio

[21] Appl. No.: 711,797

[22] Filed: Aug. 5, 1976

[51] Int. Cl.² .................... B31C 1/00; B31C 5/00
[52] U.S. Cl. ................... 156/143; 156/189; 156/195; 156/425; 156/431
[58] Field of Search .......... 156/137, 138, 143, 184, 156/189, 195, 425, 427, 430, 431, 445, 429

[56] References Cited
U.S. PATENT DOCUMENTS

| 3,019,154 | 1/1962 | Helly-Hansen | 156/143 |
| 3,524,779 | 8/1970 | Masters et al. | 156/195 |
| 3,728,189 | 4/1973 | Hannes et al. | 156/143 |
| 3,863,551 | 2/1975 | Murphy | 156/195 |
| 3,897,297 | 7/1975 | Perusse et al. | 156/425 |

FOREIGN PATENT DOCUMENTS 1,108,122  4/1968  United Kingdom ............ 156/143

Primary Examiner—Caleb Weston
Attorney, Agent, or Firm—Teare, Teare & Sammon

[57] ABSTRACT

The present invention relates to an apparatus and method for making a flexible duct of wire-reinforced construction made from a plurality of adhesive-coated polymeric tapes. The tapes are simultaneously applied from angularly oppositely disposed directions in conjunction with application of a reinforcement wire to provide a helix construction with overlapping convoluted edges to provide a duct of predetermined length.

10 Claims, 12 Drawing Figures

METHOD FOR MAKING FLEXIBLE DUCT

BACKGROUND OF THE INVENTION

The present invention relates to flexible duct in the form of convolutely-wound or helical formed bodies, and in particular, to an improved apparatus and method for making flexible, wire-reinforced duct of the type used in air-conditioning and/or heating applications, agriculture irrigation, and miscellaneous industrial or like applications wherein the duct is surrounded with insulation blanket or layer, such as fiberglas, or the like, which may be covered with an outer protective vapor barrier, such as vinyl sheathing or the like.

Heretofore, flexible hose has been formed from tape which is reinforced with wire along one edge. In such case, the wire-reinforced tape is fed between the nip of a series of rollers, looped back so the end of the tape is re-fed through the rollers to overlap the edge of the tape entering the machine so as to provide a helical form continuous hose. For example, see U.S. Pat. No. 2,674,296. In other methods, the tape is manufactured along both of its edges with wire in the same manner one edge of the tape is reinforced, as in U.S. Pat. No. 2,674,296. The tape is then formed into a helix with its edges overlapping and the two reinforcing wires interlocked to form a joint. For example, see U.S. Pat. No. 3,191,631. Heretofore, such prior apparatus and methods have been unsatisfactory in providing a light-weight, high strength flexible wire-reinforced duct which can be quickly and efficiently produced by high volume production, as will hereinafter be more fully discussed.

SUMMARY OF THE INVENTION

The present invention relates to an apparatus and method for making flexible, wire-reinforced duct made from angularly oppositely applied flexible strips disposed in overlapping relationship in respect to the reinforcement wire. In the method, a base strip is helically applied to a stationary mandrel and the reinforcement wire applied helically thereover by a grooved drive belt assembly. In one form, the mandrel may be helically grooved so that the reinforcement wire is applied with a minimum of tension so as to "float" in the mandrel groove and the corresponding groove in the drive belt. The other strip is helically applied over the reinforcement wire and in overlapping relationship with the base tape, which strip may be adhesively coated to provide a composite, unitary structure. After formation, the duct may be covered with an insulation blanket or layer which, in turn, is covered with an outer protective vapor barrier sheath to provide a finished duct or tube for air-conditioning and/or heating application as desired. It will be understood that the invention may be made without the outer sheat and/or insulation blanket in air or fluid transmission applications, such as in agriculture irrigation or like applications, or miscellaneous industrial purposes.

By the foregoing and following description and accompanying drawings, it will be seen that the present invention provides an improved apparatus and method for making flexible wire-reinforced duct or tubing which are an improvement over prior apparatus and methods. In the invention, the resultant tube or duct is of a light-weight construction yet which incorporates high strength characteristics. For example, the wire-reinforced construction provides good radial strength, such as crush resistant characteristics and good axial strength characteristics so as to resist the "pull" forces exerted thereon. In the invention, the method is carried out by a relatively simple integrated apparatus which can be automatically controlled for high or low continuous production with a minimum of manual effort. The parameters of the improved apparatus system are easily controllable so as to produce large quantities of tube or duct with high quality and with a relatively large range of diameters and lengths for a given application.

DESCRIPTION OF THE PREFERRED EMBODIMENTS

Figure 1:
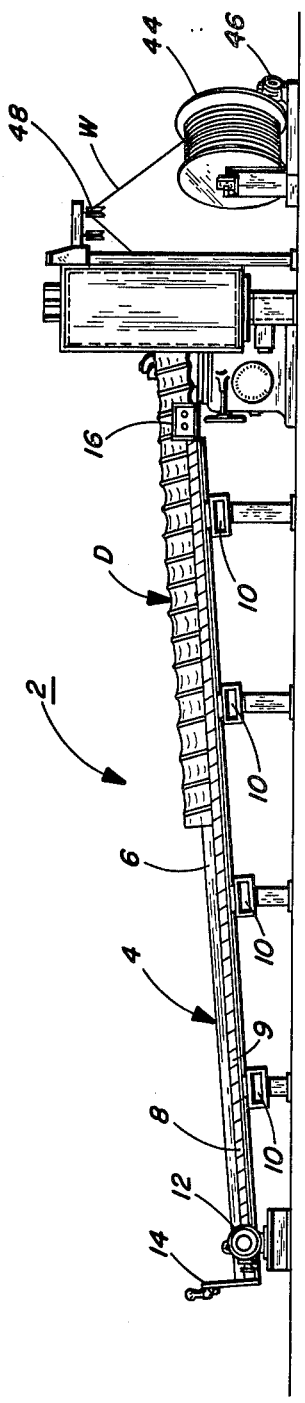
FIG. 1 is a side elevational view illustrating one form of apparatus useful in making the flexible duct of the present invention.
Figure 2:
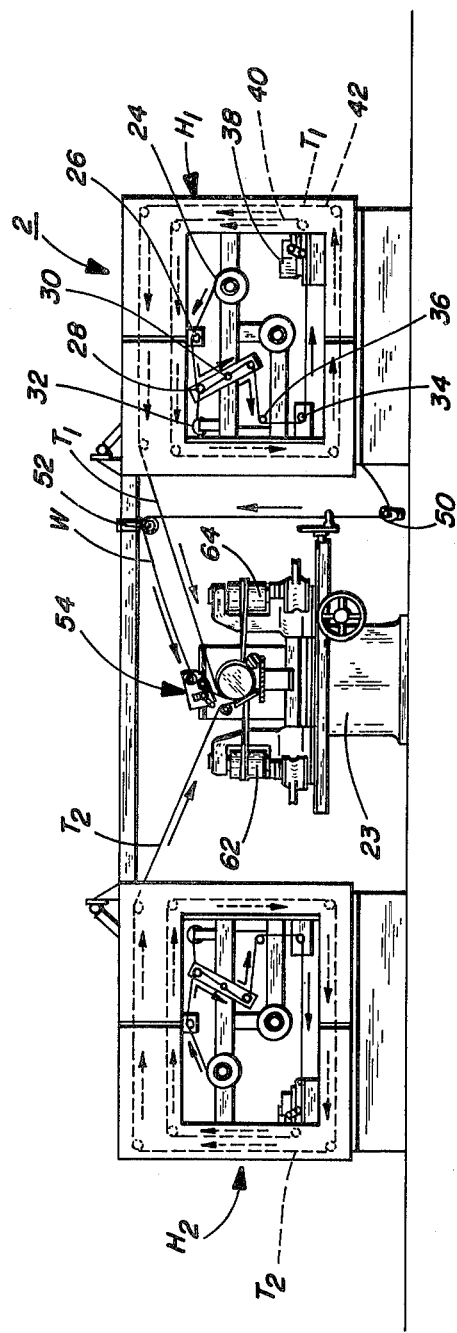
FIG. 2 is a front elevational view looking generally from the left end of FIG. 1.

Referring again to the drawings, and in particular to FIGS. 1 and 2 thereof, there is illustrated the apparatus system, designated generally at 2, for making a flexible tube or duct D of reinforced construction in accordance with the present invention. In the invention, it will be understood that the duct D can be made of indeterminate length in a continuous operation or individually of predetermined length, as desired.

In general, the apparatus system 2 includes a conveyor assembly 4 which includes a support bracket 6 extending lengthwise of the conveyor and a drive roller 8 which may be covered with a protective tape material 9 so as to prevent wear and/or damage to the fabricated duct. The drive roller 8 is supported by a series of support stands 10 which are longitudinally spaced so as to provide a predetermined angular inclination to the drive roller 8 and, hence, to the duct so as to provide a gravity-type delivery of the duct as it is fabricated along the conveyor 4.

The drive roller 8 is driven by an electric motor 12 connected thereto. For example, upon actuation of the drive motor 12, the drive roller 8 may be driven in a clockwise direction which, in turn, rotates the fabricated duct in a counter-clockwise direction for delivery on the conveyor 4. The motor 12 may be controlled by a photo-sensitive light mechanism for controlling the length of the finished duct, as desired. For this purpose, a power cut-off mechanism 16 may be provided to cut the duct to any predetermined length as determined upon actuation of the photo-sensitive device 14 which controls the motor 12 for providing duct sections of any predetermined length dependent upon a particular application. As will be seen hereinafter, the motor 12 is operated at a predetermined speed so as to be synchronized with the rate of production of the duct in accordance with the present invention.

Figure 9:
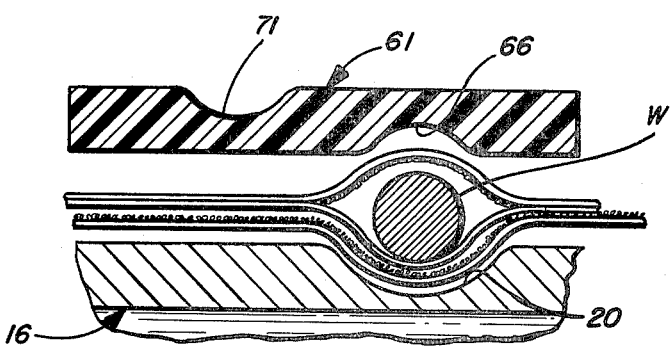
FIG. 9 is an enlarged fragmentary section view illustrating the relationship between the strips, wire, mandrel and drive belt.

In the invention, the duct D is made upon a stationary mandrel 16 (FIG. 6) which is preferably made of a hollow cylindrical member 18. The mandrel 16 is of a relatively short length (e.g., 6 inches) and may be, in one form, provided with a helical groove 20 which is axially spaced with a predetermined pitch distance (e.g., 1 inch) so as to provide the corresponding pitch distance (FIG. 6) between the convolutions of the reinforcing wire W formed therein. The mandrel 16 may be fixedly attached to a bracket member 22 (FIG. 6) mounted on a housing 23 (FIG. 2) which mounts the mandrel and wire forming and guide mechanism. In the invention, the groove 20 (FIG. 9) is preferably of a generally U-shaped configuration having a dimension slightly greater than the corresponding diameter of the wire W so that the wire acts to "float" in the groove. For example, the wire may have a diameter of between 0.041 and 0.051 inches with the groove having a radius of 0.030 inches. By this arrangement, there is provided an optimum application of the wire with a minimum of pressure or tension thereon. For example, it is preferred that the wire W be applied with a tension not in excess of 1 pound to achieve optimum results. It is to be understood, however, that the groove may be omitted to provide a smooth mandrel for different applications, as desired. Further, it is preferred that the mandrel 16 be disposed at a predetermined angle, such as 6°, with respect to the general horizontal plane of the housing 23. Accordingly, the conveyor 4 is disposed at the same angle so as to maximize the continuous delivery of the fabricated duct.

In the invention, the duct D is fabricated preferably from two independent flexible strips $T_1$ and $T_2$ (FIG. 11) which are delivered from opposite sides of the mandrel 16. For example, the strips $T_1$ may have a widthwise dimension of 2 inches, whereas, the strip $T_2$ may have a widthwise dimension of 1½ inches so as to provide an overlap construction in respect to the strip of approximately ½ inch, where the pitch distance ($p$) is 1½ inches. It is to be understood, however, that the strips may have various widths to provide the required overlap relationship, as desired. For example, the strip $T_1$ may have a widthwise dimension of 1⅜ inch, whereas, the strip $T_2$ may have a widthwise dimension of 1 5/16 inch so as to provide an overlap of ⅜ inch where the pitch distance ($p$) between adjacent convolutions of the wire (FIG. 6) is 1 inch.

Figure 4:
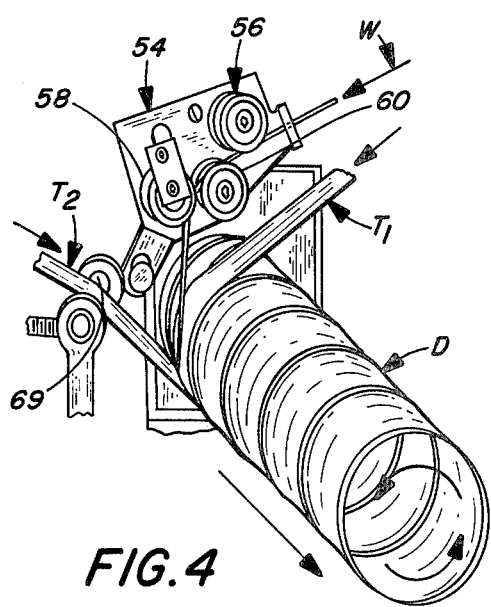
FIG. 4 is a fragmentary, generally perspective view illustrating the wire applicator mechanism of the present invention.
Figure 11:
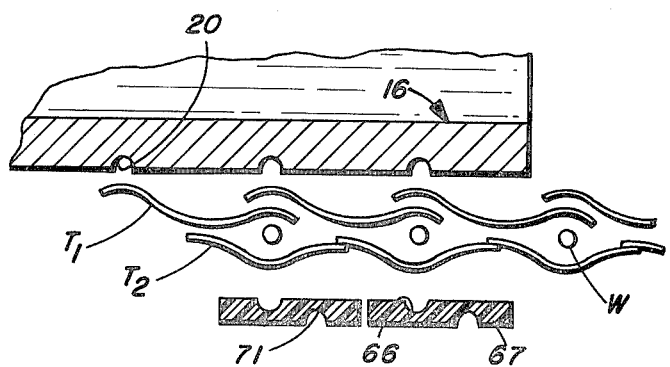
FIG. 11 is a fragmentary schematic view illustrating a one wire, two strip embodiment.

In accordance with the invention, the strips, such as $T_1$ and $T_2$, may be made of a suitable high strength, flexible material, such as a woven or non-woven fabric cloth, plastic or the like. Preferably, the strips are made from a high strength flexible, polymeric material, such as Mylar tape or the like. As seen in FIG. 2, the strip $T_1$ may be fed in from the right side, whereas, the strip $T_2$ is fed in from the left side so as to continuously produce the fabricated duct. In such case, for example, the strip $T_1$ may be the base or substrate layer having the widthwise dimension of 2 inches, whereas, the strip $T_2$ provides the cover layer which may have a widthwise dimension of 1½ inches. Hence, the strip $T_2$ provides the cover layer over the wire W and the base strip $T_1$ as best seen in FIGS. 4 and 11. Hence, as the duct D is fabricated in an axial direction (shown by the arrow), the strips $T_1$ and $T_2$ in conjunction with the wire W are fed in synchronized relation in a counter-clockwise direction in a generally helical orientation.

In the form shown in FIGS. 2 and 11, the strips $T_1$ and $T_2$ are delivered from laterally spaced heater or oven units $H_1$ and $H_2$. Since the ovens are of generally identical construction, the following description will proceed with respect to the oven $H_1$ wherein like reference characters are utilized to designate like parts. As shown, the tape may be delivered from a supply spool 24 over a guide roller 26 and then through a tension bar 28 which is pivotally mounted, as at 30, for pivotal movement in response to a spring connection 32 for maintaining a predetermined tension on the strips. The strip passes from the mechanism 28 via guide rollers 34, 36 into a coating applicator 38 for applying a suitable coating to the strip. From the applicator 38, the strip passes through a closed path through a first polygonal loop 40 and then through a second polygonal loop 42 in a counter-clockwise direction and then outwardly and downwardly in the direction of the arrow for helical disposition around the mandrel 16. In the invention, the oven $H_1$ may be heated, such as by a hot-air blower or the like, so as to impart the desired physical characteristics to the strip. By this arrangement, it will be seen that the generally spiraled, closed loop construction provides a path for allowing the strip to dry so that the adhesive is of the proper tacky state for securement with the other strip $T_2$. In the present invention, any thermal plastic or mixtures, including a thermal plastic generally known as hot melts, and solvent activated adhesives, having suitable properties for best seal and/or adhesive application, may be utilized. For example, individual thermal plastic resins, such as polyethylene, polystyrene or polyamide may be used. Moreover, the coating composition may be selectively formulated for multiple physical and/or thermal characteristics, such as adhesion, flame retardance, flexibility or the like.

Figure 5:
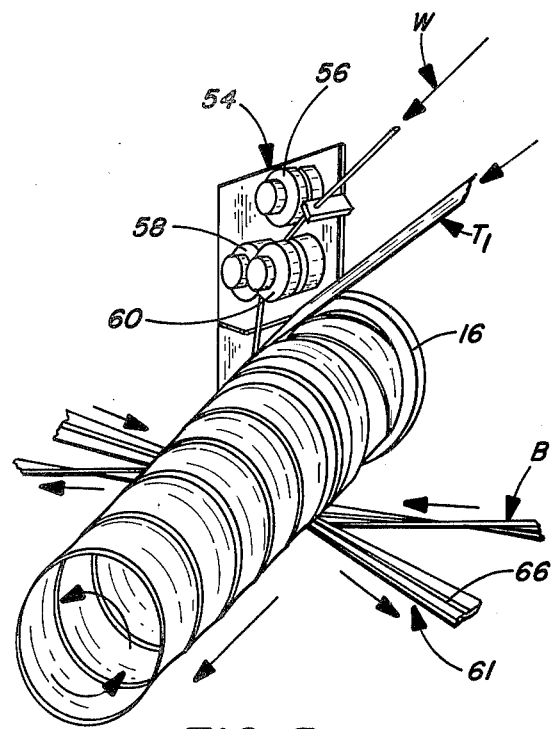
FIG. 5 is a fragmentary, generally perspective view of the wire applicator and drive belt mechanism.

In the invention, the strip $T_1$ (FIG. 5) for example, is helically applied in one form to the mandrel 16, and the reinforcement wire W applied by a belt mechanism B. As seen in FIG. 1, the wire W is provided from a supply spool or spools for a multi-wire construction 44 which may be motor driven as at 46, for synchronous relation with respect to the speed of rotation of the formed duct D.

Figure 3:
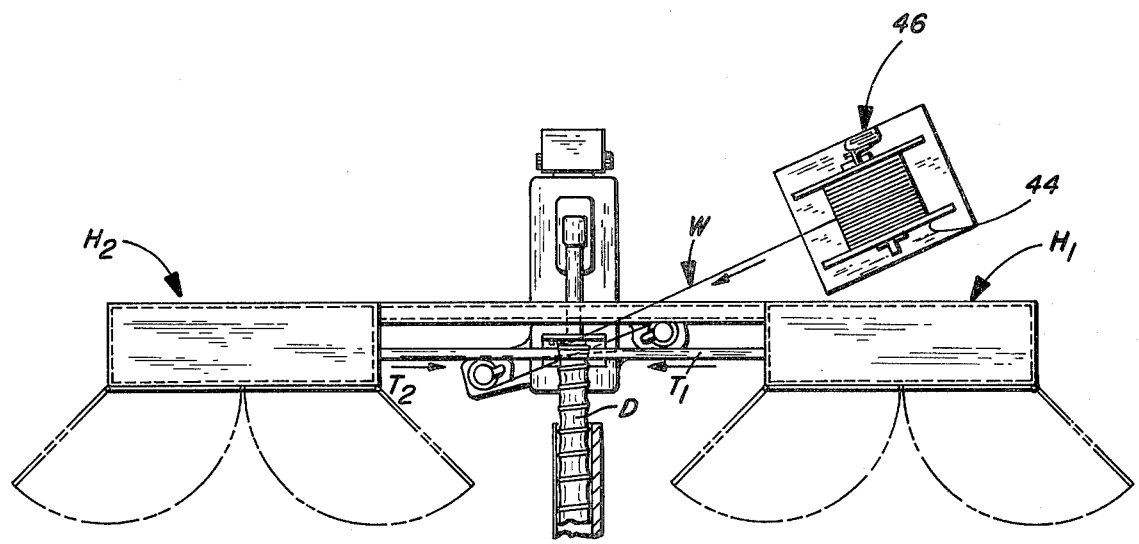
FIG. 3 is a fragmentary enlarged top view looking downwardly generally at the right hand end of FIG. 1.

The wire W may be fed over a pulley 48 (FIG. 1 and 2) down around a pulley 50 and up around a pulley 52 into a wire former mechanism 54. As shown in FIG. 4, the mechanism 54 may include a fixed guide roller 56 and a pair of free rotating rollers 58 and 60 for imparting a generally cylindrical configuration to the wire so as to conform to the helical groove 20 in the mandrel 16. Hence, as best seen in FIG. 3, the strips $T_1$ and $T_2$ are fed generally at right angles with respect to the longitudinal central axis of the formed duct D, whereas, the wire W is fed in at an acute angle. The wire W is driven helically around and within the groove 20 in the mandrel 16 via the belt mechanism which is of a generally figure-eight configuration.

Figure 7:
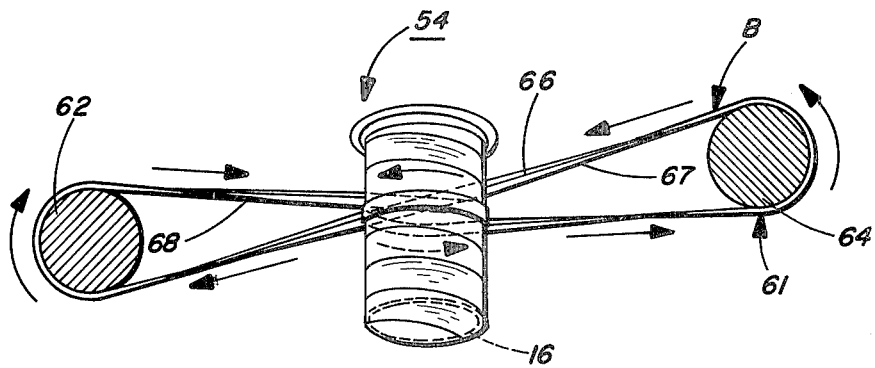
FIG. 7 is a fragmentary, diagrammatic illustration showing the drive belt confirugation of the present invention.

As best seen in FIG. 7, the mechanism 54 includes a rubber or rubber reinforced belt 61 trained around a pair of drums 62 and 64 which may be synchronously driven for rotation in counter-clockwise and clockwise directions, respectively, via a suitable motor (not shown) mounted on the housing 23. As shown, the belt 61 has a longitudinally disposed endless inner groove 66 formed therein so as to correspond to the dimension of the wire W in relation to the corresponding dimension of the groove 20 in the mandrel 16. Preferably, the respective grooves 20 and 66 have a radius (0.030 inches) or slightly greater than that of the diameter of the wire W so that the wire can be nested in a "floating" relation within the grooves. In this form, the belt 61 includes a first stretch 67 which passes under the mandrel 16 (FIG. 7) and a second stretch 68 which passes under, up and around the mandrel 16 so as to drive the wire W in a counter-clockwise direction around the mandrel within the groove 20 thereof. Simultaneously, with application of the reinforcement wire W, the strip $T_2$ is delivered from the heater $H_2$ over guide bar 60 (FIG. 4) so as to be disposed in overlapping relationship with respect to the base or substrate strip $T_1$. It will be understood that the wire could be driven in a clockwise direction, as desired.

Figure 10:
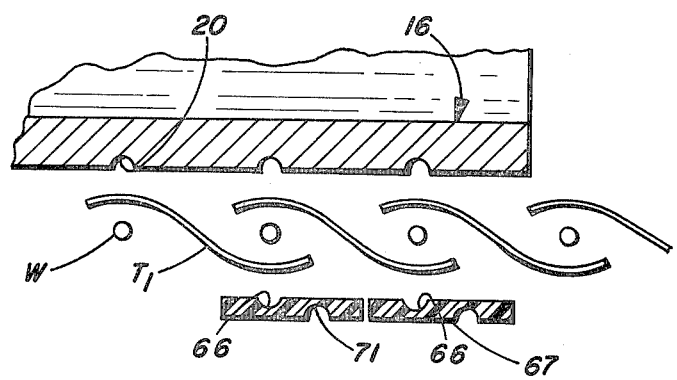
FIG. 10 is a fragmentary schematic view illustrating a one wire, one strip embodiment.
Figure 12:
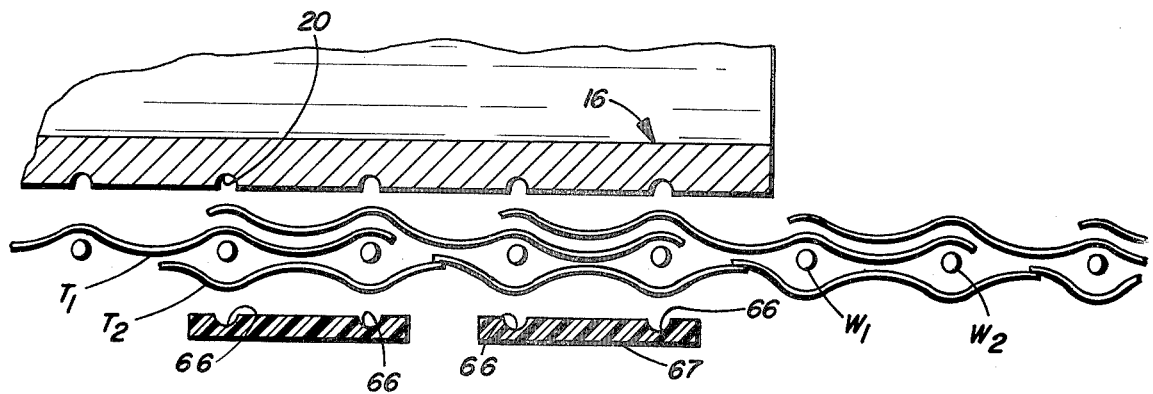
FIG. 12 is a fragmentary schematic view illustrating a two wire, two strip embodiment of the invention.

As best seen in FIGS. 7 and 10 to 12, the belt 61 including stretches 67 and 68, may have a similar groove 71 on the outside surface to provide for reversibility of the belt after wear, for example. Moreover, as seen in FIG. 10, there may be employed a single wire W with a single strip $T_1$, or a single wire W with two strips $T_1$ and $T_2$ (FIG. 11) or a multi-wire arrangement as shown in FIG. 12 wherein two wires $W_1$ and $W_2$ with two strips $T_1$ and $T_2$ are employed. Hence, in the multi-wire arrangement, the belt 61 may be provided with a pair of laterally spaced longitudinal grooves 66 for increased production, as desired.

Figure 6:
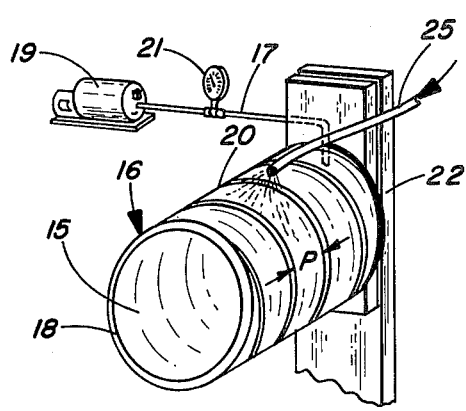
FIG. 6 is a fragmentary, generally perspective view illustrating the grooved mandrel and lubricant applicator mechanism of the present invention.

In the invention, a suitable lubricant may be applied to the strip so as to lubricate the same in relation to the mandrel 16. For example, as shown in FIG. 6, the lubricants, such as oil, may be applied directly to the strip $T_1$ (FIG. 5) via a pipe 25, shown in FIG. 5. In another form, the mandrel 16 may be fabricated from a fluid pervious material, such as a sintered powdered metal or the like. In such case, the end 18 of the mandrel may be closed, as at 15, with a plug or the like and fluid pressure introduced interiorly of the mandrel 16 via a conduit 17 supplied from a suitable fluid pressure pump 19. A suitable control guage 21 may be provided to regulate pressure of the mandrel interior so as to pneumatically (i.e., floatation) lubricate the strips moved onto the mandrel.

Figure 8:
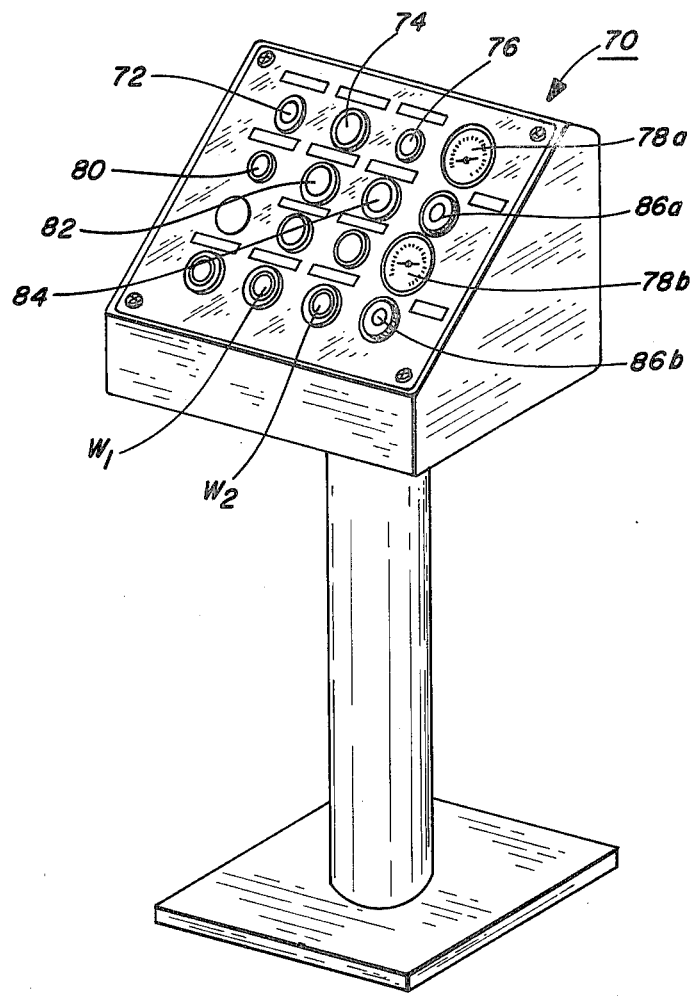
FIG. 8 is a generally perspective view illustrating one type of control console which may be employed with the present invention.

As seen in FIG. 8, there may be provided a control console in the form of a stand-model, designated generally at 70, which may be advantageously employed for automatically controlling operation of the apparatus for making the flexible tube or duct D from a remote location, as desired. For example, the console may include an automatic start button 72 which may be pushed with adjustment to a control knob 74 being made to provide the desired machine speed. Control knobs 80 and 82 may be adjusted for trimming in adhesive (coating) to the applicator 38 in respect to strips $T_1$ and $T_2$. The feed rate for the wires $W_1$ and $W_2$ may be adjusted by control knobs $W_1$ and $W_2$. The predetermined desired tension on the strips $T_1$ and $T_2$ may be maintained by control knobs 86$a$ and 86$b$ for regulating the tension mechanism 28 and 30, as seen in FIG. 2. Once the trim is properly adjusted, then the speed pot may be increased or decreased so that all drives will remain proportional. Push button 80 is provided to stop all drives, and the air flow and temperature to the ovens is regulated by control knob 76.

I claim:

1. Method for making a flexible, wire-reinforced duct comprising:
   providing a stationary mandrel having an endless helical groove corresponding in shape to the cross-sectional shape of a reinforcement wire,
   providing a drive belt positioned opposite said groove,
   feeding at least one flexible strip wider than and conformable to said groove in helical relation onto said mandrel,
   feeding at least one reinforcement wire substantially simultaneously in helical relation over said strip by causing said belt to press said strip into the groove in said mandrel, and overlapping said strip and wire by a covering,
   applying adhesive at some time to at least one of said strips and wire to provide a composite unitary structure,
   said drive belt has an endless longitudinally spaced groove dimensioned so as to receive the cross-sectional dimension of said reinforcement wire, and wherein the groove in said belt is disposed opposite the groove in said mandrel, and
   said wire is fed from the groove in said belt whereby a portion of the wire is disposed within the confines of the mandrel groove.

2. A method in accordance with claim 1, including controlling the feed-rate of said reinforcement wire so as to helically form said wire around said strip with a substantially minimum tension.

3. A method in accordance with claim 1, including applying tension to said strip, and
   automatically controlling the tension on said strip in accordance with the feed-rate for the production of finished duct.

4. A method in accordance with claim 1, including applying an insulation blanket in encompassing relation around and wire-reinforced strip, and
   applying a protective sheath in encompassing relation around said blanket.

5. A method in accordance with claim 1, including applying fluid pressure to the interior of said mandrel, and
   forcing said fluid through the material of said mandrel to provide a lubricating effect on said strips in relation to said mandrel.

6. A method in accordance with claim 1, wherein the application of the covering is by feeding a second flexible strip in helical overlapped relation with respect to said first strip and said reinforcement wire.

7. A method in accordance with claim 1, including rotating said duct after formation on said mandrel in an axial direction away from said mandrel, and
   cutting said duct to predetermined lengths.

8. A method in accordance with claim 7, including automatically determining the length of the finished duct, and
   automatically cutting said duct to said predetermined length.

9. A method in accordance with claim 1, including applying an adhesive coating to said strip, and
   curing said adhesive coating to provide a tack condition thereof.

10. A method in accordance with claim 9, wherein said curing includes passing said strip through a loop-like path in a heating chamber prior to delivery to said mandrel.

* * * * *